US010794497B2

(12) United States Patent
Yu et al.

(10) Patent No.: US 10,794,497 B2
(45) Date of Patent: Oct. 6, 2020

(54) VACUUM-BASED ENERGY-SAVING LARGE-CAPACITY PRECISION PRESSURE REGULATION VALVE

(71) Applicant: Taiwan Chelic Co., Ltd., New Taipei (TW)

(72) Inventors: Ping-Cheng Yu, New Taipei (TW); Chih-Sheng Cheng, New Taipei (TW)

(73) Assignee: TAIWAN CHELIC CO., LTD., New Taipei (TW)

(*) Notice: Subject to any disclaimer, the term of this patent is extended or adjusted under 35 U.S.C. 154(b) by 113 days.

(21) Appl. No.: 16/168,835

(22) Filed: Oct. 24, 2018

(65) Prior Publication Data

US 2019/0264820 A1    Aug. 29, 2019

(30) Foreign Application Priority Data

Feb. 26, 2018  (TW) .............................. 107106291 A

(51) Int. Cl.
*F16K 17/18*  (2006.01)
*F16K 17/22*  (2006.01)
(Continued)

(52) U.S. Cl.
CPC ................. *F16K 7/06* (2013.01); *F16K 7/07* (2013.01); *F16K 17/18* (2013.01); *F16K 17/22* (2013.01); *F16K 17/30* (2013.01); *F16K 27/08* (2013.01); *F16K 31/122* (2013.01); *G05D 16/185* (2013.01); *Y10T 137/7796* (2015.04)

(58) Field of Classification Search
CPC . F16K 7/17; F16K 17/22; F16K 17/30; F16K 17/18; F16K 27/0236; F16K 31/1264; F16K 31/1266; F16K 31/1268; F16K 31/128; F16K 31/165; F16K 31/365; F16K 31/385; F16K 31/3855; G05D 16/163; G05D 16/185; G05D 16/0636; G05D 16/0652; G05D 16/0661; G05D 16/0669; G05D 16/0672; Y10T 137/7768; Y10T 137/777; Y10T 137/7796
See application file for complete search history.

(56) References Cited

U.S. PATENT DOCUMENTS 9,086,701 B2 *  7/2015  Okitsu .................. G05D 16/163
10,352,464 B2 *  7/2019  Yu ....................... G05D 16/0661

FOREIGN PATENT DOCUMENTS

WO    WO-2014000472 A1 *  1/2014 ........... G05D 16/163

* cited by examiner

*Primary Examiner* — Hailey K. Do
(74) *Attorney, Agent, or Firm* — Leong C. Lei

(57) ABSTRACT

A vacuum-based energy-saving large-capacity precision pressure regulation valve includes a base valve seat, a middle valve seat, and a pressure regulation seat. The base valve seat includes a main channel that receives a primary-side pressure and a secondary-side pressure to flow therein and includes a valve port piston arranged in the base valve seat to form a valve port opening. The valve port piston is rotatably coupled to a sealing straight rod that is coupled to a main diaphragm. The main diaphragm is clamped between the middle valve seat and the base valve seat to form a vacuum pressure chamber. A balance diaphragm is clamped between the middle valve seat and the pressure regulation seat. An atmosphere passage is connected to a space below the balance diaphragm. A guide passage and a feedback passage are in communication with the vacuum pressure chamber and the main channel.

3 Claims, 6 Drawing Sheets

(51) Int. Cl.
*G05D 16/18* (2006.01)
*F16K 7/06* (2006.01)
*F16K 31/122* (2006.01)
*F16K 7/07* (2006.01)
*F16K 27/08* (2006.01)
*F16K 17/30* (2006.01)

VACUUM-BASED ENERGY-SAVING LARGE-CAPACITY PRECISION PRESSURE REGULATION VALVE

(a) TECHNICAL FIELD OF THE INVENTION

The present invention relates to a vacuum-based energy-saving large-capacity precision pressure regulation valve, which has a main body in which a main channel, a guide passage, a feedback passage, and an atmosphere passage are formed so that with these channel and passages connected to a vacuum pressure chamber to allow a main diaphragm arranged in the vacuum pressure chamber to move in collaboration with balance of pressure differential achieved by a throttle hole and also to cause a balance diaphragm to move through a balance passage to thereby allow the main body to conduct regulation of pressure in an enlarged range and to also achieve the purposes of both energy saving and accurate pressure regulation without the need of drawing in a flow of the atmospheric pressure.

(b) DESCRIPTION OF THE PRIOR ART

Vacuum precision pressure regulation valves that are widely used in the field of automatized facility, either in domestic market or in abroad market, must consistently draw in air in order to maintain accuracy of vacuum pressures of the pressure regulation valves. Vacuum precision pressure regulation valves of this type must continuously suck in a flow of external air through a pressure fluid involved in an operation thereof. Although it is possible to achieve a desired goal, the resources consumed in such an operation would inevitably raise the overall cost of product fabrication. The amount of such an expense, after being accumulated for a long term, would be a huge amount. Thus, to improve the accuracy and efficiency of automatized fabrication process, pneumatic circuits have been proposed in this industry for the purposes of achieving high precision of output pressure by reducing the amount of air drawn in thereby. However, the structures of such vacuum precision pressure regulation valves may not be easy to manufacture and the structures are complicated in light of manufacturing and fabrication. Thus, there is still desired to make further improvements.

Some of the known patent documents, which were invented by the Inventor are briefly discussed below:

Taiwan Utility Model M513295 provides an axle-guided vacuum pressure reducing valve, of which a structure includes a main diaphragm and a straight rod. The straight rod is formed, in an interior thereof, with a penetrating guide hole, which allows gas flowing therein to pass through a shortened route to reduce the number of parts required and also to simplify the process of assembling. It is however found that after being actually produced and used, such a guide hole structure, although effective in achieving the purposes of shortening the gas route to thereby reduce the number of parts involved and the steps required for assembling, still requires a flow of atmosphere air to be drawn in for the operation of the main diaphragm and the straight rod during the operation of the device, and the flowing of air and accuracy of vacuum pressure may exhibit certain degree of delay.

Taiwan Utility Model M532528 discloses an energy-saving vacuum-based precision pressure regulation valve, of which a structure includes a plurality of passages formed therein to allow a pressure fluid to collaborate with a main valve port and a straight rod valve port the stabilize an internal pressure of a main body, so that balance can maintain without the need of drawing in a flow from the atmosphere, and additionally, a pressure regulator is provided for precise regulation to improve an efficiency of operation thereof. The straight rod valve port is contact engagement with a balance diaphragm on the top side so that during regulation of pressure flow, since a piston is made having an excessively large suction area, the balance diaphragm is affected as being sucked downward and incapable of returning to an original condition. This causes instability of gas flowing during the operation of the device.

The improvements that were proposed in the previously utility models include simplification of part design to improve the complication process of assembling and improvement of internal passages to allow pressure fluid to induce substantially equivalent pressure that, through feeding back, allow for great reduction of energy consumption. Although these solutions provide certain achievements, they are not good for accuracy of vacuum pressure and may still suffer unsmooth operation. Thus, further improvements may be desired.

SUMMARY OF THE INVENTION

The present invention relates to a vacuum-based energy-saving large-capacity precision pressure regulation valve, of which a primary technical purposes is to use a main diaphragm coupled to a sealing straight rod correspondingly assembled in a valve port piston to allow the main diaphragm to be smoothly driven by a vacuum suction force to drive the valve port piston for carrying out an opening/closing operation of the valve port opening.

A secondary technical purpose is to arrange an operation push rod between a pressure regulating straight rod and a balance diaphragm to reduce a suction surface area of the balance diaphragm in order to improve the problem that the operation push rod does not return as being sucked and fixed by the vacuum suction force.

A further technical purpose is that in an open condition of a valve port piston with respect to a valve port opening, upper and lower sides of a main diaphragm are kept at a balanced condition of a vacuum suction force in order to maximize a flow through the valve port opening.

The present invention provides a vacuum-based energy-saving large-capacity precision pressure regulation valve, which comprises a base valve seat, a middle valve seat, and a pressure regulation seat, which are connected to each other in sequence from bottom to top. The base valve seat comprises a main channel through which a primary-side pressure and a secondary-side pressure may flow and a valve port opening formed by a valve port piston arranged in a middle portion of the base valve seat. The valve port piston is rotatably coupled, at an interior thereof, to a sealing straight rod that comprises a main diaphragm. The valve port piston has a bottom that forms a piston overflow aperture connected to the sealing straight rod. The main diaphragm is clamped between the middle valve seat and the base valve seat to be so positioned as to form a vacuum pressure chamber. A balance diaphragm is clamped between the pressure regulation seat and the middle valve seat to be so positioned that a pressure regulating straight rod is located below the balance diaphragm. The pressure regulating straight rod is arranged in a receiving chamber formed in a middle portion of the middle valve seat. A guide passage extends from the main channel through the receiving chamber to reach into the vacuum pressure chamber. An atmosphere passage is formed in the middle valve seat and is connected to a space below the balance diaphragm to allow for flowing of the atmospheric pressure.

A feedback passage is formed in an underside of the middle valve seat to extend into an interior of the pressure regulation seat. The feedback passage is also connected to the main channel. When the primary-side pressure moves through the guide passage to the vacuum pressure chamber, a vacuum suction force is induced to have the main diaphragm moving upward and thus causing the valve port opening to open, and the vacuum suction force simultaneously forms the secondary-side pressure, which after being subjected to balance of pressure differential by means of a throttle hole of the feedback passage, flows into the pressure regulation seat to push back the balance diaphragm and the pressure regulating straight rod so as to close the guide passage. When the main diaphragm is no longer moved and a balanced stable condition is achieved, the middle valve seat and the main body may achieve the purposes of accurate regulation of pressure and saving energy without drawing in the atmospheric pressure.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
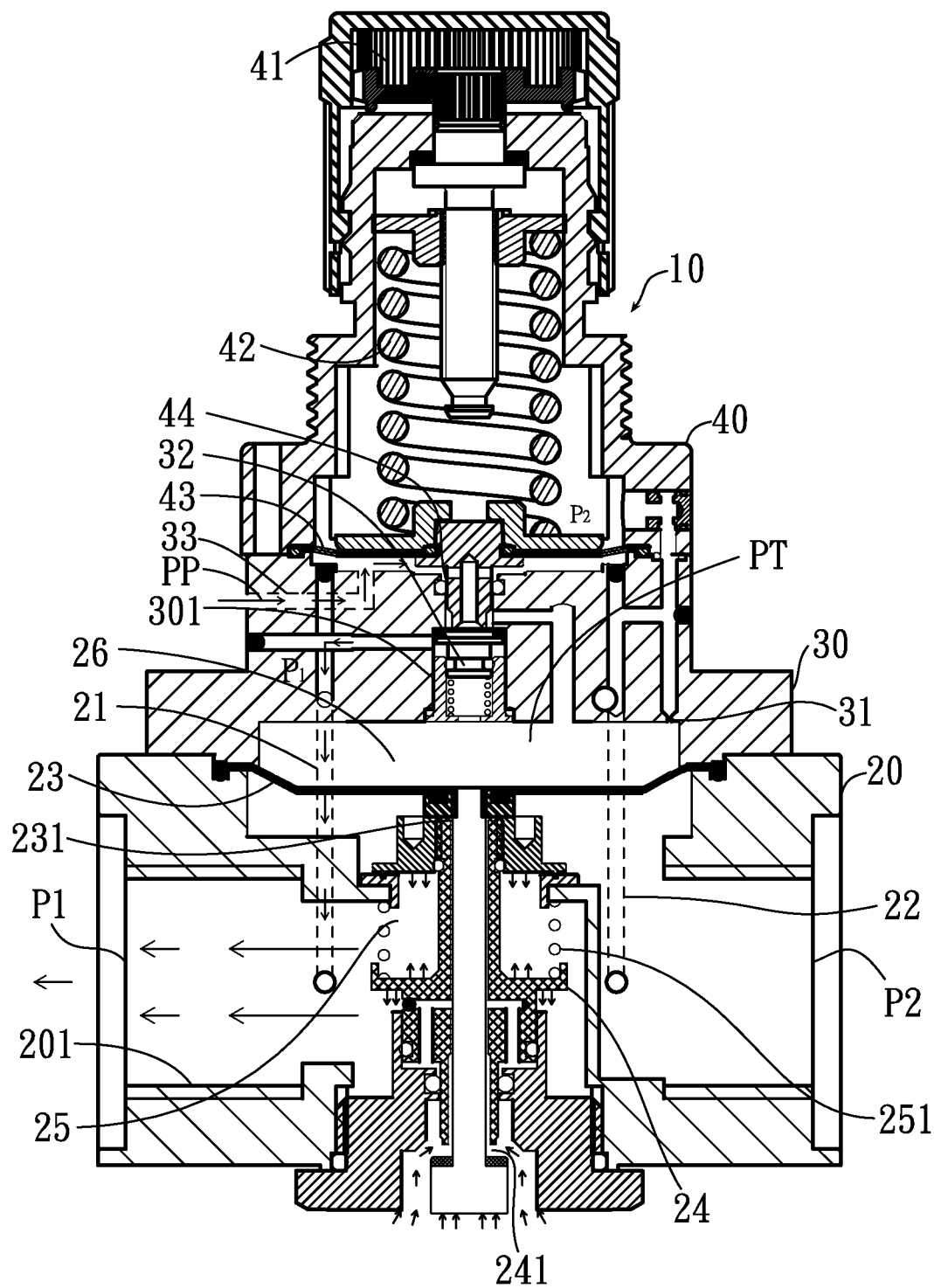
FIG. 1 is a cross-sectional view showing a structure of the present invention in a standby condition.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a vacuum-based energy-saving large-capacity precision pressure regulation valve, of which a structure comprises: a main body (10), which comprises a base valve seat (20), a middle valve seat (30), and a pressure regulation seat (40) that are arranged in sequence from bottom to top and connected to each other by means of bolts to provide a combined, unitary structure. The base valve seat (20) comprises a main channel (201) formed therein for passage of and fluid connection between a primary-side pressure (P1) and a secondary-side pressure (P2), and a valve port opening (25) formed by a valve port piston (24) arranged in a middle portion of the base valve seat (20). The aforementioned primary-side pressure (P1) is or provides a vacuum-based suction force. The valve port piston (24) is rotatably coupled, at an interior thereof, with a sealing straight rod (231) that is coupled to a main diaphragm (23). The valve port piston (24) has a bottom that forms, in combination with the sealing straight rod (231), a piston overflow aperture (241) that is adjustable in size and is openable/closable. In detail, the piston overflow aperture (241) is movable or rotatable for adjusting an opening formed of a gap between the hole and the bottom and the valve port piston (24) in order to control an amount of ingress flow of external atmosphere. The main diaphragm (23) is interposed and clamped between the middle valve seat (30) and the main body (10) to be so positioned as to form a vacuum pressure chamber (26). In addition, a balance diaphragm (43) is interposed and clamped between the pressure regulation seat (40) and the middle valve seat (30) for being so positioned that a pressure regulating straight rod (32) arranged below the balance diaphragm (43) is in abutting engagement therewith. The pressure regulating straight rod (32) is arranged in a receiving chamber (301) that is formed in a middle portion of the middle valve seat (30). An operation push rod (44) is further provided between the balance diaphragm (43) and the pressure regulating straight rod (32). The operation push rod (44) makes a suction area of the pressure regulating straight rod (32) reduced to a minimum and thus, a suction power induced by the vacuum suction force (PT) is reduced to a minimum, preventing the balance diaphragm (43) from being affected by vacuum and being attached, through suction, to the middle valve seat (30).

A guide passage (21) is arranged to cover a range of extension that starts from the main channel (201) through the receiving chamber (301) to reach into an interior of the vacuum pressure chamber (26). A feedback passage (22) is arranged to cover a range of extension that starts from an underside of the middle valve seat (30) and extends to and is in communication with an interior of the pressure regulation seat (40). The feedback passage (22) is also connected to the main channel (201). An atmosphere passage (33) is formed in an interior of the middle valve seat (30) and covers a range of extension that starts from outside of a lateral side surface of the middle valve seat (30) to reach into and in communication with a space below the balance diaphragm (43) so as to allow for flowing of the atmospheric pressure (PP) for controlling operation of the pressure regulating straight rod (32).

Referring to FIG. 1, which shows the main body (10) in a standby condition, the secondary-side pressure (P2) is zero gauge pressure, and a pressure fluid in the interior of the main body (10) is acted upon by the vacuum suction force induced by the primary-side pressure (P1) to have the pressure fluid inside the guide passage (21) to discharge out through the main channel (201). It is shown that the pressure regulating straight rod (32) of the receiving chamber (301) is set in a closed condition and the pressure fluid inside the guide passage (21) is not allowed to flow into the vacuum pressure chamber (26); however, the atmosphere passage (33) still receives and holds, in the interior thereof, the atmospheric pressure (PP) from the outside, so that no vacuum suction force (PT) is induced to act on the main diaphragm (23). At the moment, the valve port opening (25) is also in a closed condition, while the piston overflow aperture (241) is in an open condition so that the atmospheric pressure (PP) enters the secondary-side pressure (P2) side of the base valve seat (20) and makes the secondary-side pressure (P2) zero gauge pressure.

Figure 2:
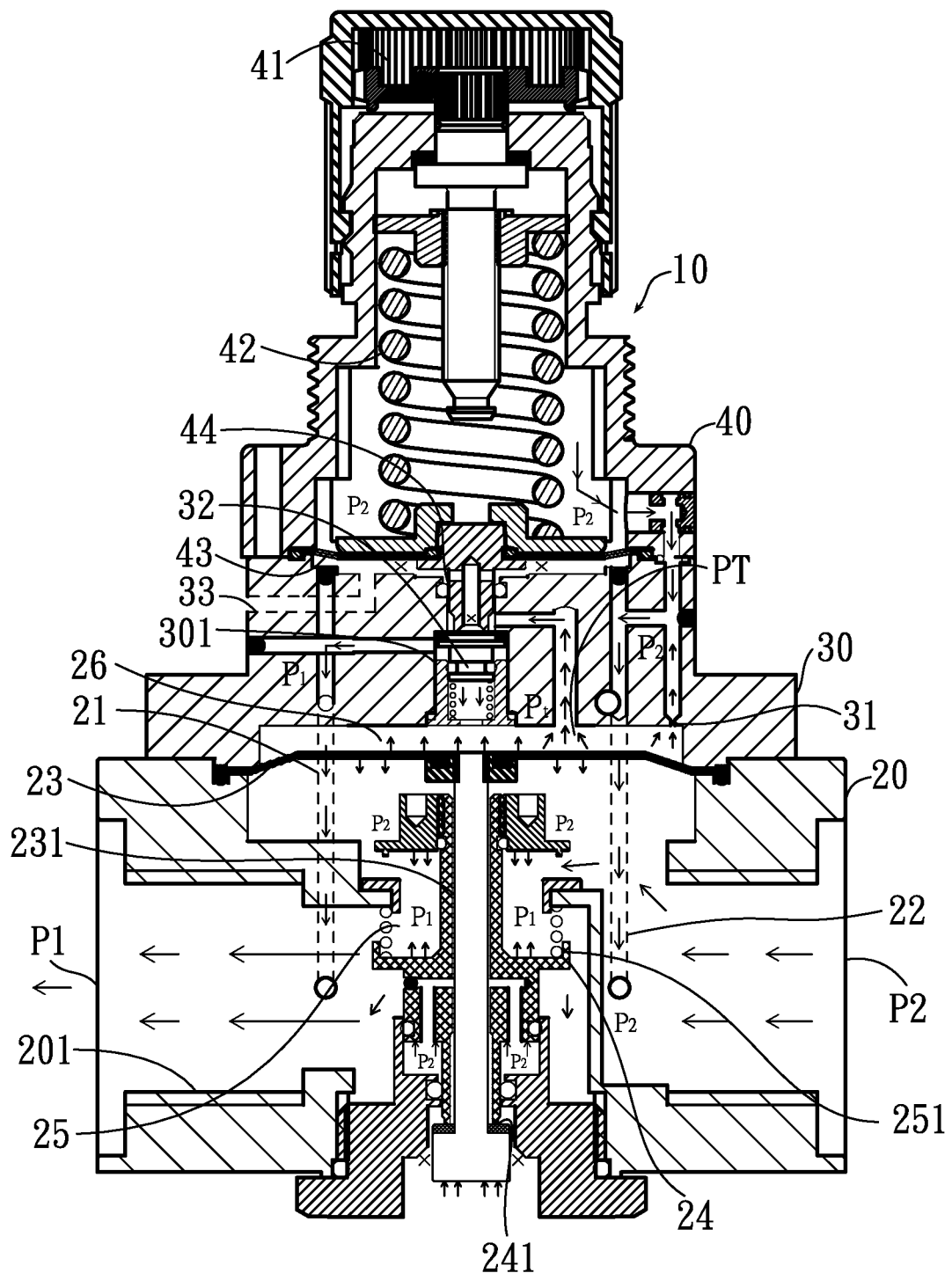
FIG. 2 is a cross-sectional view showing the structure of the present invention in a working condition.

Referring to FIG. 2, which shows the main body (10) in a working condition, where the secondary-side pressure (P2) is less than zero gauge pressure, under such a condition, the pressure regulating straight rod (32) is driven by a primary spring (42) to move by a stroke of an extremely short distance and the primary-side pressure (P1) inside the guide passage (21) is allowed to pass through the receiving chamber (301) and reach into the vacuum pressure chamber (26), and under such a condition, the primary-side pressure (P1) forms a vacuum suction force (PT) to thereby drive the main diaphragm (23) to move upward, and under such a condition, the valve port piston (24) is also caused to move to set the valve port opening (25) in an open condition. The valve port opening (25) being set into the open condition is because the sum of a product of the vacuum suction force (PT) multiplied by an upper side surface area of the main diaphragm (23) is greater than a product of the secondary-side pressure (P2) multiplied by a lower side surface area of the main diaphragm (23) and a spring force of a spring (251) that would reach a balance condition with an upward movement so as to open the valve port opening (25), and specifically, when the valve port piston (24) is moved upward for opening, the vacuum suction force (PT) flows to the space above the main diaphragm (23), which is referred to as the upper side, while in the lower side, the primary-side pressure (P1) flows through the valve port opening (25) to be discharged and the secondary-side pressure (P2) and the spring (251) that is compressed generate a pushing force so that when the forces of the upper side and the lower side counter act each other and balanced with each other, a displacement of the valve port piston (24) being lifted upward reaches a maximum. Increasing a surface area of the valve port opening (25) and/or raising the secondary-side pressure (P2) would eventually makes a maximum air flow rate an allowable maximum flow through the valve port opening (25).

Figure 3:
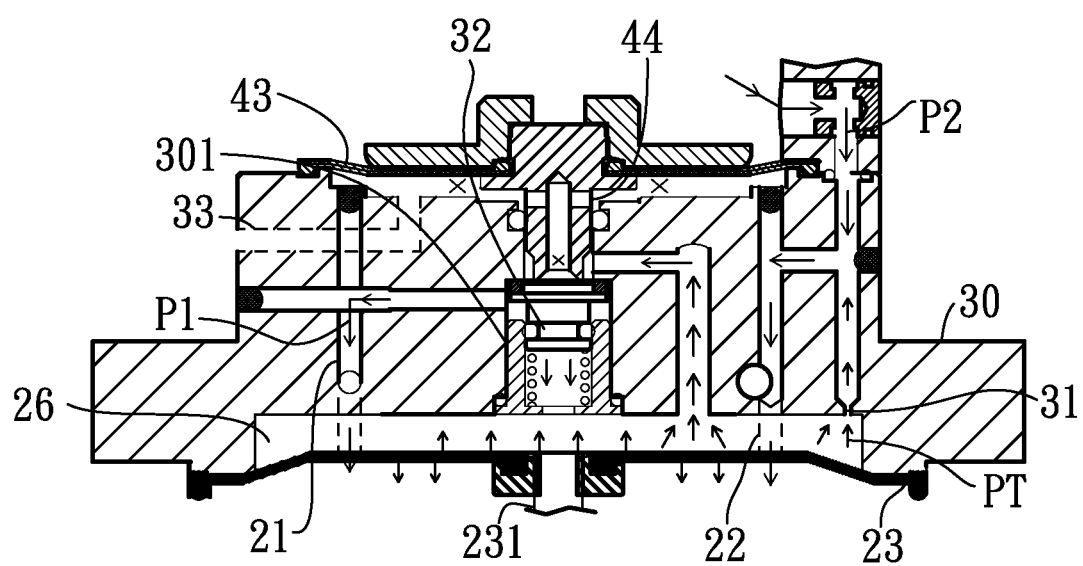
FIG. 3 is a cross-sectional view, in an enlarged form, illustrating a portion of the structure of the present invention in a working condition.
Figure 4:
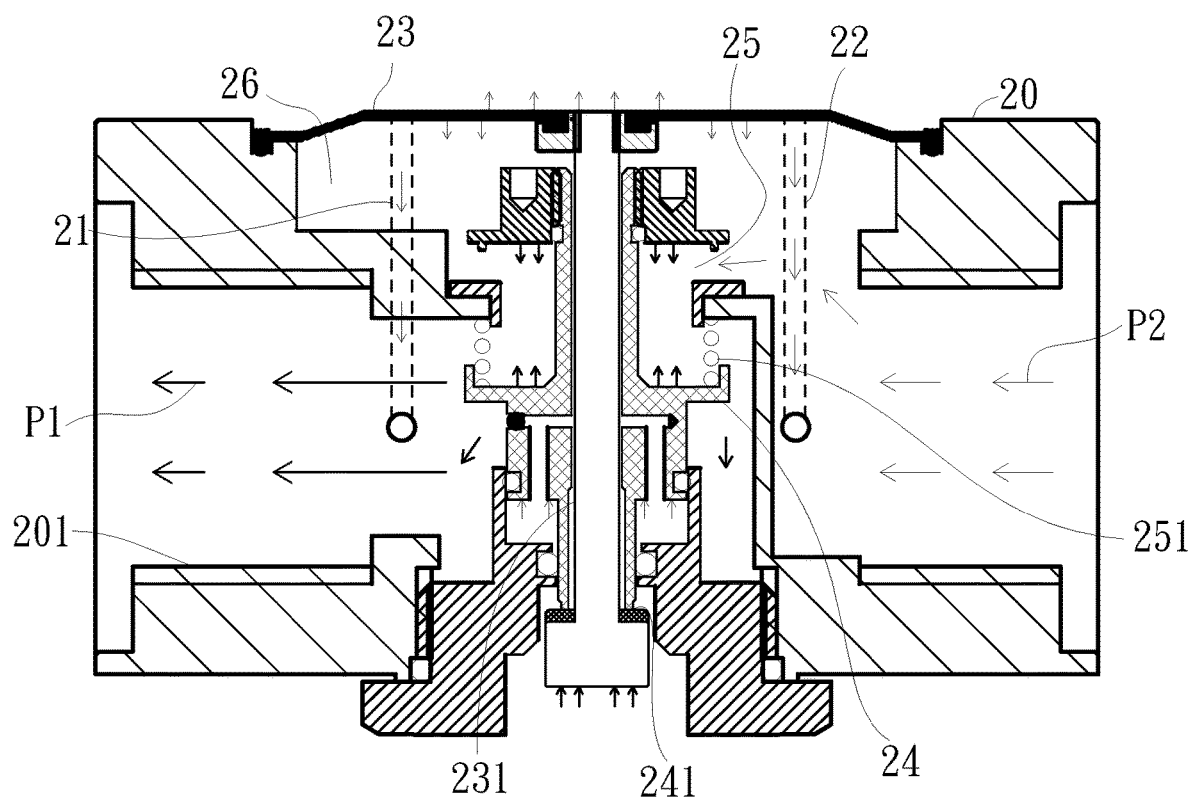
FIG. 4 is a cross-sectional view, in an enlarged form, illustrating a portion of the structure of the present invention in a working condition.

Further, as can be seen in FIG. 3, the middle valve seat (30) generally uses the feedback passage (22) to control the secondary-side pressure (P2) for keeping a stable flow rate so that drawing in and thus consuming atmospheric air is made 0, while the throttle hole (31) provides a pressure differential balance effect that helps keep accuracy of pressure. With reference to FIG. 4, the base valve seat (20) functions to control flowing of the secondary-side pressure (P2) therethrough in a maximized manner and to allow the movement of the main diaphragm (23) to adjust a displacement range of the valve port piston (24) for increasing in order to increase the flow of air drawn in and also makes it possible, in case of the secondary-side pressure (P2) being shut down, to achieve pressure balance by means of the throttle hole (31), allowing the main diaphragm (23) not to be closed quickly. Thus, it can be seen that the middle valve seat (30) is generally for control of the main diaphragm (23) and operation of the throttle hole (31), while the base valve seat (20) is for control of flow rate.

Figure 5:
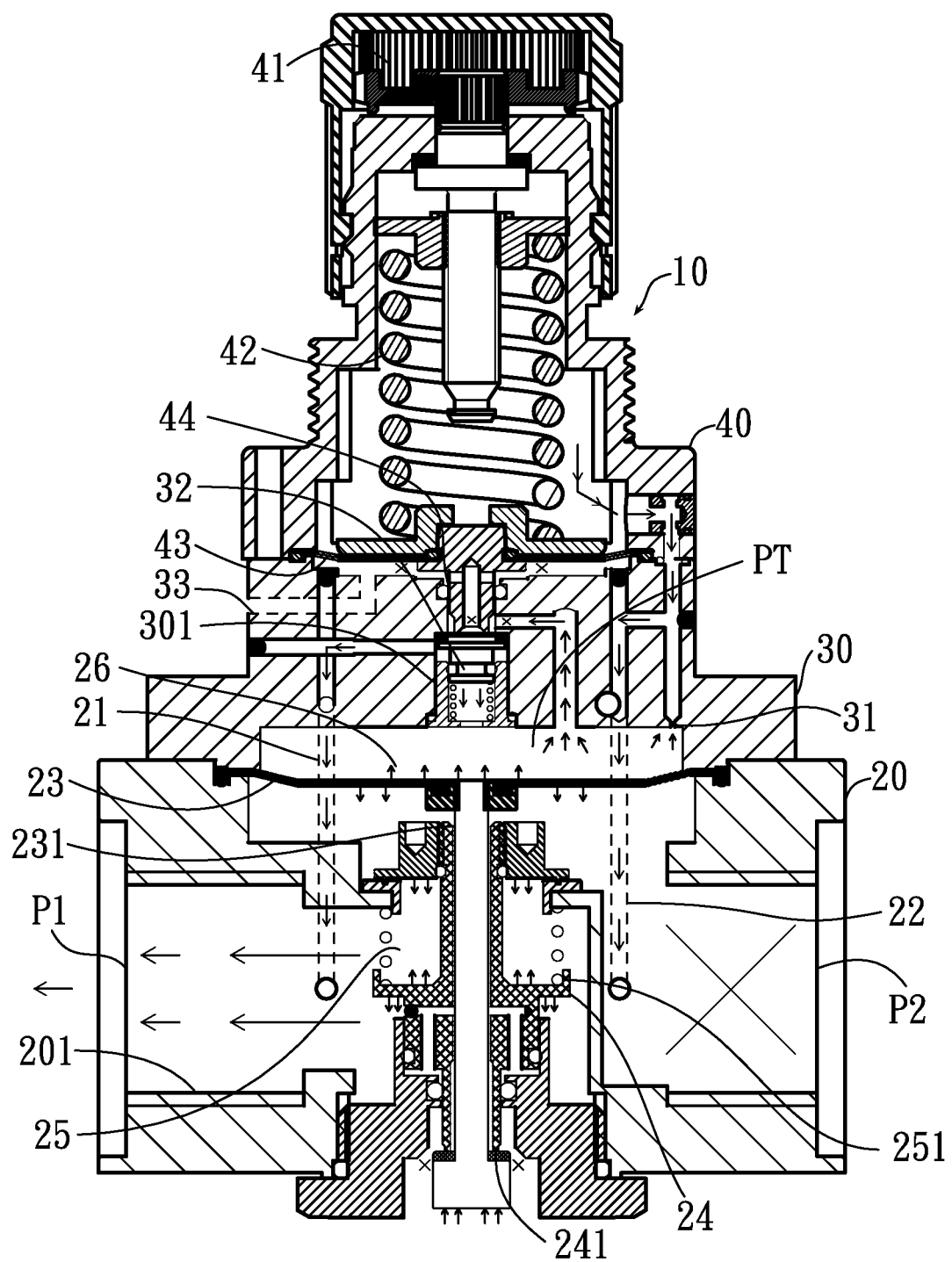
FIG. 5 is a cross-sectional view illustrating the present invention in a sustaining or adjusting condition.
Figure 6:
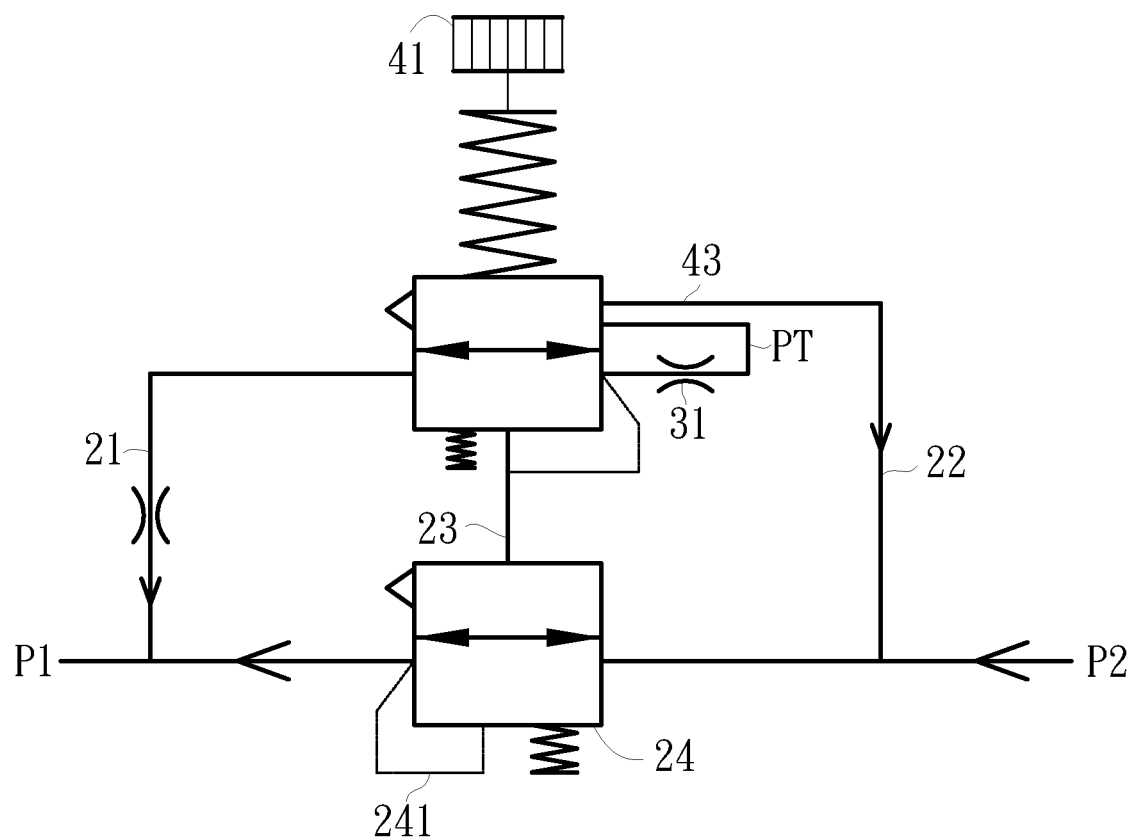
FIG. 6 is a schematic view illustrating a control circuit of the present invention.

When the valve port piston (24) is caused by the main diaphragm (23) to move upward, the vacuum suction force (PT) forms the secondary-side pressure (P2), and the secondary-side pressure (P2), after being subjected to pressure balance by means of the throttle hole (31) of the feedback passage (22), flows into the pressure regulation seat (40) to drive the balance diaphragm (43) and the pressure regulating straight rod (32) downward and thus making the guide passage (21) closed. Under the condition that the main diaphragm (23) no longer moves, the middle valve seat (30) and the main body (10) may achieve the purposes of accurate regulation of pressure and saving energy without drawing in atmospheric air, as shown in FIG. 5.

In summary, the present invention provides a vacuum-based energy-saving large-capacity precision pressure regulation valve, which comprises a main body (10) in which a main channel (201), a guide passage (21), and a feedback passage (22) are formed and arranged such that a primary-side pressure (P1), a secondary-side pressure (P2), and a vacuum suction force (PT) are allowed to flow therein so that a main diaphragm (23) is operable in combination with a valve port piston (24) to selectively open and close a valve port opening (25), and also, the atmospheric pressure (PP) is allowed to enter an atmosphere passage (33) to assist operation of a balance diaphragm (43) for preventing the balance diaphragm (43) from being sucked and completely fixed, allowing the flow inside the main body (10) to achieve the purposes of accurate regulation of pressure and reducing energy consumption.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:
1. A vacuum-based energy-saving large-capacity precision pressure regulation valve, comprising:
   a main body which comprises:
      a base valve seat;
      a middle valve seat; and
      a pressure regulation seat that are connected to each other in sequence from bottom to top, the base valve seat comprising a main channel that receives a primary-side pressure and a secondary-side pressure to flow therein and a valve port opening formed by a valve port piston arranged in a middle portion of the base valve seat, the valve port piston being rotatably coupled, at an interior thereof, with a sealing straight rod that is coupled to a main diaphragm, the valve port piston having a bottom that forms, in combination with the sealing straight rod, a piston overflow aperture that is adjustable and is openable/closable, the main diaphragm being clamped between the middle valve seat and the base valve seat to be so positioned as to form a vacuum pressure chamber, a balance diaphragm being clamped between the pressure regulation seat and the middle valve seat for being so positioned that a pressure regulating straight rod is located below the balance diaphragm, the pressure regulating straight rod being arranged in a receiving chamber that is formed in a middle portion of the middle valve seat;
   wherein a guide passage being formed to extend from the main channel through the receiving chamber to reach into the vacuum pressure chamber;

wherein a feedback passage being formed in an underside of the middle valve seat to extend into an interior of the pressure regulation seat, the feedback passage being also connected to the main channel; an atmosphere passage being formed in the middle valve seat and connected to a space below the balance diaphragm to allow for flowing of the atmospheric pressure;

wherein the primary-side pressure moves through the guide passage into the vacuum pressure chamber to generate a vacuum suction force, which causes the main diaphragm to bring the valve port piston to move upward and thus opening the valve port opening, and the vacuum suction force simultaneously forming the secondary-side pressure, the secondary-side pressure being subjected to pressure differential balance by means of a throttle hole of the feedback passage to flow to the pressure regulation seat to drive backward the balance diaphragm and the pressure regulating straight rod and thus, closing the guide passage;

wherein when the main diaphragm is no longer moved and a balanced stable condition is achieved, the middle valve seat and the main body achieve the purposes of accurate regulation of pressure and saving energy without drawing in a flow of the atmospheric pressure.

2. The vacuum-based energy-saving large-capacity precision pressure regulation valve according to claim 1, wherein the balance diaphragm further comprises an operation push rod, which is arranged between the balance diaphragm and the pressure regulating straight rod to reduce a suction surface area of the pressure regulating straight rod to a minimum, so that a suction power induced by the vacuum suction force is reduced to a minimum, and a surface area of the balance diaphragm that is acted upon by the atmospheric pressure is increased to a maximum to prevent the balance diaphragm from being sucked and attached to the middle valve seat.

3. The vacuum-based energy-saving large-capacity precision pressure regulation valve according to claim 1, wherein the valve port opening is openable when the valve port piston is driven and increasing an area of the valve port opening, increasing a displacement of the valve port piston to a maximum, and increasing the secondary-side pressure provides an allowable maximum air flow of the vacuum suction force.

* * * * *